Jan. 15, 1935.   P. H. DUSSUMIER DE FONBRUNE   1,987,733
DEVICE FOR CONTROLLING FROM A DISTANCE THE DISPLACEMENTS OF CERTAIN ORGANS
Filed April 24, 1933     8 Sheets-Sheet 1

Fig.1

INVENTOR
Pierre Henry Dussumier de Fonbrune

Jan. 15, 1935. P. H. DUSSUMIER DE FONBRUNE 1,987,733
DEVICE FOR CONTROLLING FROM A DISTANCE THE DISPLACEMENTS OF CERTAIN ORGANS
Filed April 24, 1933 8 Sheets-Sheet 2

INVENTOR
Pierre Henry Dussumier de Fonbrune
BY
ATTORNEY

Jan. 15, 1935. P. H. DUSSUMIER DE FONBRUNE 1,987,733
DEVICE FOR CONTROLLING FROM A DISTANCE THE DISPLACEMENTS OF CERTAIN ORGANS
Filed April 24, 1933 8 Sheets-Sheet 3

INVENTOR
Pierre Henry Dussumier de Fonbrune
BY
ATTORNEY

Jan. 15, 1935. P. H. DUSSUMIER DE FONBRUNE 1,987,733
DEVICE FOR CONTROLLING FROM A DISTANCE THE DISPLACEMENTS OF CERTAIN ORGANS
Filed April 24, 1933 8 Sheets-Sheet 4

INVENTOR
Pierre Henry Dussumier de Fonbrune
BY
ATTORNEY

INVENTOR
Pierre Henry Dussumier de Fonbrune
BY
Conway P. Coe
ATTORNEY

Jan. 15, 1935.   P. H. DUSSUMIER DE FONBRUNE   1,987,733.
DEVICE FOR CONTROLLING FROM A DISTANCE THE DISPLACEMENTS OF CERTAIN ORGANS
Filed April 24, 1933   8 Sheets-Sheet 6

INVENTOR
Pierre Henry Dussumier de Fonbrune
BY
ATTORNEY

Jan. 15, 1935. P. H. DUSSUMIER DE FONBRUNE 1,987,733
DEVICE FOR CONTROLLING FROM A DISTANCE THE DISPLACEMENTS OF CERTAIN ORGANS
Filed April 24, 1933 8 Sheets-Sheet 7

INVENTOR
Pierre Henry Dussumier de Fonbrune
BY
ATTORNEY

Jan. 15, 1935.   P. H. DUSSUMIER DE FONBRUNE   1,987,733
DEVICE FOR CONTROLLING FROM A DISTANCE THE DISPLACEMENTS OF CERTAIN ORGANS
Filed April 24, 1933    8 Sheets-Sheet 8

INVENTOR,
Pierre Henry Dussumier de Fonbrune

Patented Jan. 15, 1935

1,987,733

UNITED STATES PATENT OFFICE 1,987,733

DEVICE FOR CONTROLLING FROM A DISTANCE THE DISPLACEMENTS OF CERTAIN ORGANS

Pierre Henry Dussumier de Fonbrune, Boulogne-sur-Seine, France

Application April 24, 1933, Serial No. 667,753
In Belgium April 28, 1932

25 Claims. (Cl. 88—40)

My invention relates to devices for controlling from a distance the displacements of certain organs and more particularly displacements that must take place in the field of a microscope of any other similar apparatus, especially in order to conduct experiments of micro-dissection, micro-chemistry and generally speaking micro-manipulations.

The chief object of my invention is to provide an apparatus of that kind that is capable of being worked more easily and with a higher precision than it was possible up to this time.

In order to obtain this result, I provide the apparatus of the type in question with at least one operating organ adapted to be brought into various positions either in a plane or in the three-dimensional space, and capable of actuating, parallelly to several components of its movements respectively, transmission systems that connect it to the receiving devices, which act in turn on the organs that are to be displaced. Said transmission systems are such that they are operated either individually or simultaneously according as the displacements of the operating organ take place along one of said components at a time or several components simultaneously. Furthermore, the displacements of said devices must be connected to those of said organ through a determined law of continuity.

According to an embodiment of my invention, the operating organ is mounted on a suitable frame through a Cardan joint, and the pivoting displacements of said organ about the axes of said joint are kinematically imparted to two pistons moving in corresponding cylinders respectively. The kinematic connection between the controlling organs and the pistons, comprises cams operatively connected with said operating organ and adapted to cooperate with contact members operatively connected with said pistons.

According to another embodiment of my invention, the kinematic connection between the controlling organs and the pistons consists of connecting rods provided with cranks which are respectively centered about the axis of the Cardan joint, the whole being so arranged that the pivoting movement about a given axis can influence only the corresponding piston.

In still another embodiment of my invention, the needle or any other organ to be operated through the apparatus according to my invention is supported freely by elastically deformable organs controlled by said transmission systems and adapted to impart the desired displacements to said needle under the effect of their own deformations. This arrangement makes it possible to do away with all guiding organs that may interfere with the displacement of the organs.

According to another feature of the last mentioned embodiment, the various parts are so disposed that they permit, for at least some of the displacements to be imparted to said needle, to keep the latter substantially in the same direction, said displacements taking place either in said direction, or transversely thereto.

A third feature of the last mentioned embodiment consists in so arranging the parts that, for at least one of the displacements imparted to the needle, said displacement is connected to those of one of the sides of a deformable parallelogram, the direction of which side remains invariable in the course of its displacement.

Preferred embodiments of my invention will be hereinafter described with reference to the appended drawings given merely by way of example and in which.

Figure 1:
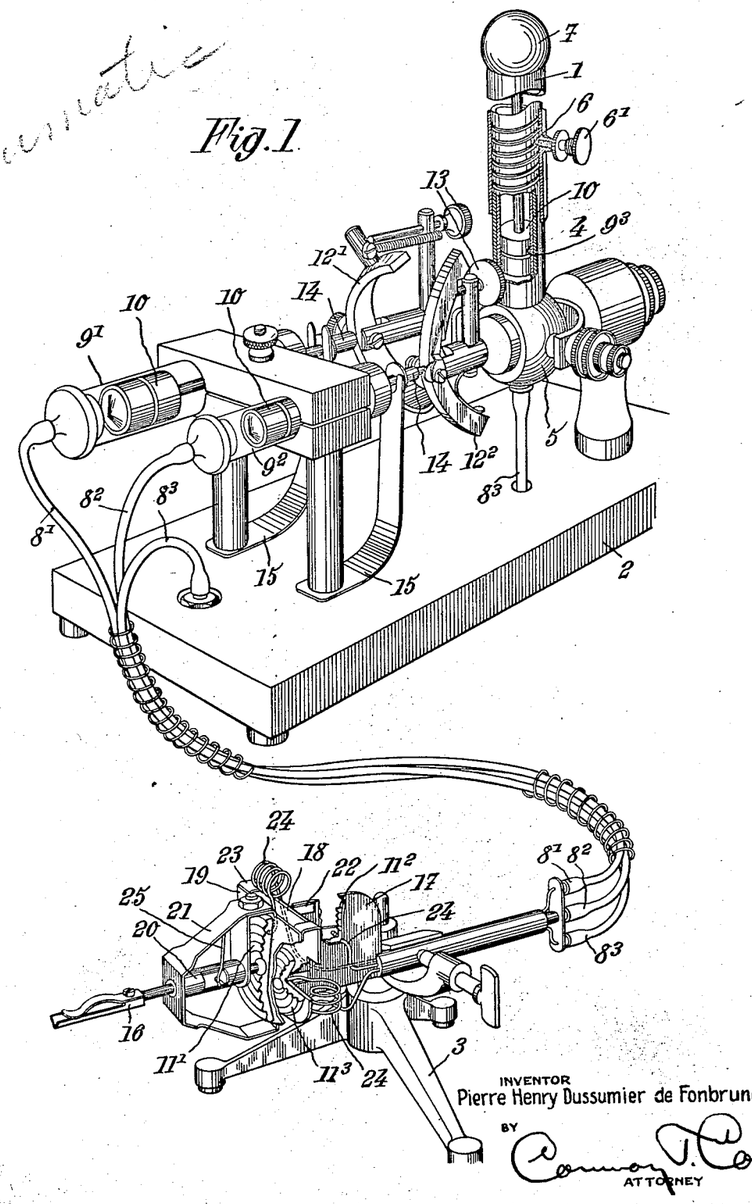
Fig. 1 is a perspective view showing an apparatus for controlling the displacements of an organ, for instance a needle, in the field of a miscroscope, in order, for instance to effect micro-manipulations such as those to be carried out in biological experiments, such apparatus being made according to my invention.

In the embodiment of Fig. 1, it will be supposed, by way of example, that it is desired to displace an organ such as a needle in the field of a microscope, in any direction that is to say in a vertical direction, or in a longitudinal direction or in a transversal direction, or simultaneously in these three directions.

I make use of an operating organ 1 which may be mounted in a frame 2, preferably independent of that of the microscope. This organ, which is adapted to be moved in all directions, can operate, for instance along three perpendicular components of its own displacements, three transmission systems through which it acts on corresponding receiving devices, said receiving devices directly actuating the needle holder or any other organs for supporting the needle. The receiving devices of the needle holder are for instance mounted in an adjustable support 3, adapted to bring the needle into a predetermined position. The whole is so arranged that it makes it possible to actuate said devices either separately or simultaneously according as the movements imparted to operating organ 1 take place either along only one of its components or along several of them. The displacements of said devices are connected to those of said operating organ through a determined law of continuity, which law in the present case is such that the movements imparted to said organ are considerably reduced in order, for instance, that I may, obtain at will successive displacements of the needle averaging one micron.

I will first describe how operating organ 1 is devised for this purpose. Said organ is carried by lever 4 which is mounted in a universal joint 5 so that said lever may pivot in all directions. Organ 1 is further adapted to slide with respect to said lever and therefore preferably consists of a hollow organ mounted with a snug fit on lever 4 which is of cylindrical shape (Fig. 1).

In order that the operator may obtain a progressive translatory movement of organ 1 along lever 4, said translatory motion may be combined with a rotary motion of these two organs 1 and 4 with respect to each other. For this purpose, I may for instance, provide on the outer surface of lever 4 screw threads on which a small lug 6 carried by operating organ 1 may engage. This lug 6 will preferably be movable and will for instance consist of a screw provided with a lock-nut $6^1$ so that the action of the screw may eventually be done away with thus leaving the operating organ free to slide on said lever.

Owing to this arrangement, the operator may move the knob 7 of the operating organ in all directions, transversally, longitudinally or vertically, these three kinds of movements taking place either separately or simultaneously.

I will now describe the transmission systems to which these movements are imparted, and which serve to transmit them to the receiving devices above referred to. These transmission systems may be of two kinds:

(a) Either of the hydraulic or pneumatic type, or again of the hydro-pneumatic type, or (b) of the electric type.

In the latter case, the displacements of the control organ are adapted to produce either inductively or directly, variations of currents flowing in circuits that control said receiving devices, the latter consisting for instance each of an armature subjected to the action of an electric field energized by one of said circuits.

However, I do not wish to limit my invention to these two kinds of transmitting systems.

Figure 2:
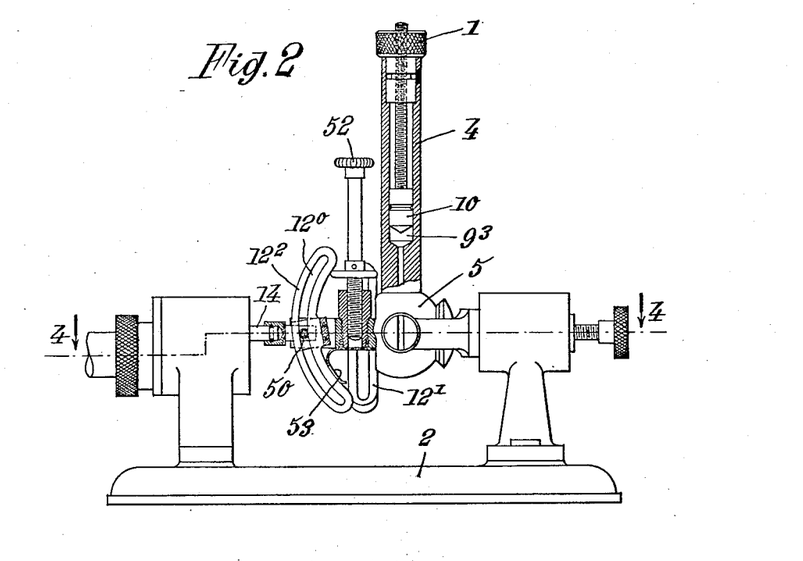
Fig. 2 is an elevational view of a portion of another embodiment of the apparatus according to my invention.

I will first describe the pneumatic transmission system shown in Figs. 1 and 2. Three tubes, preferably flexible tubes $8^1$, $8^2$, $8^3$ are connected at one end, on the side of the operating organ, with devices adapted to transform the movements of said organ into displacements of fluid in said tubes, said devices consisting for instance of cylinders $9^1$, $9^2$, $9^3$ in which are provided, with a fluidtight fit, pistons 10, operated through a suitable kinematic transmission by the operating organ. The other ends of tubes $8^1$, $8^2$ and $8^3$ respectively are connected with the receiving devices, which consist essentially of movable or deformable organs such that for relatively important displacements of pistons 10 said organs give the needle only very small displacements. Said organs consist for instance of deformable boxes $11^1$, $11^2$ and $11^3$ made of a flexible material such as silver, copper, maillechort, brass, india-rubber etc., which boxes have a suitable inner volume and are adapted to act on levers or other organs connecting them to the needle holder.

As for the organs that permit the operating organ to act on pistons 10, they are made as follows:

On the one hand, for the components of the pivoting movements of lever 4, I make use of two cams $12^1$, $12^2$ adapted to control the pistons of two cylinders $9^1$, $9^2$, which are carried by parts integral with frame 2. Said cams are preferably adjustable, for instance by means of screws 13, and they are connected to rods 14 integral with the corresponding pistons, either in a uni-directional manner as shown in Fig. 1, the contact between said rods and said cams being ensured by means of springs 15, or in a positive manner.

On the other hand, the sliding movements of the control organ with respect to lever 4 are transmitted through an organ integral with the third piston 10, the cylinder $9^3$ of which is mounted inside said lever.

Figure 3:
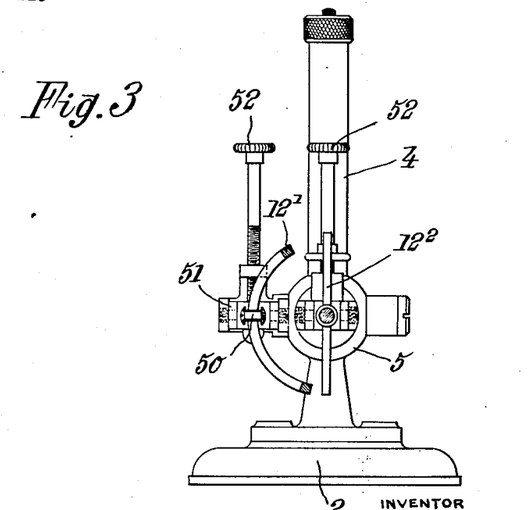
Fig. 3 is a side view corresponding to Fig. 2.
Figure 4:
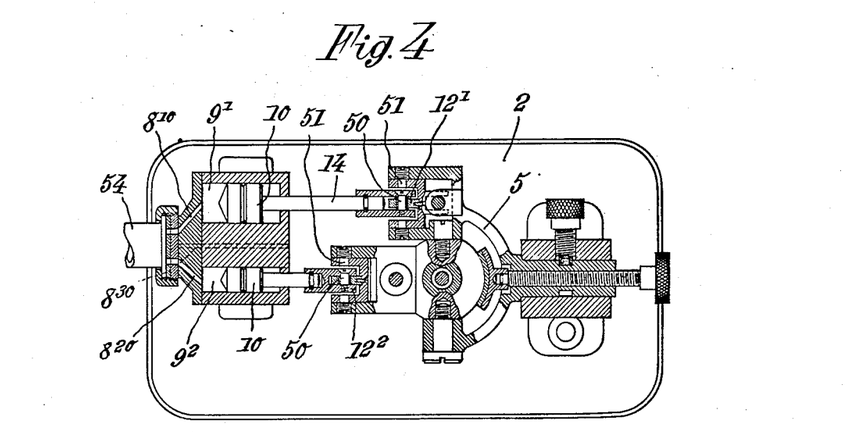
Fig. 4 is a sectional view on the line 4—4 of Fig. 2.

In the Figs. 2 to 4, I have shown by way of example, a control apparatus in which the connection between cams $12^1$ and $12^2$ and the rods of the corresponding pistons respectively, is positive, and made in such manner that a pin 50 carried by each of said rods engages a slot $12°$ provided in each of said cams respectively.

In order to adjust the position of said cams, I may for instance mount them in a pivoting manner about axes 51, and I control their displacements about said axes by means of screws such as 52, preferably connected in an elastic manner with said cams, for instance through a spring leaf 53. (Fig. 2.)

The connection between flexible tubes $8^1$, $8^2$, $8^3$ and the corresponding pistons respectively may be obtained by means of conduits $8^{10}$, $8^{20}$, $8^{30}$ (Fig. 4) provided for instance in the block comprising cylinders $9^1$ and $9^2$, and leading to a common sleeve 54 through which said flexible tubes may be caused to pass.

As for the levers or other organs to be provided between boxes $11^1$, $11^2$ and $11^3$, and the needle holder 16, they are made as follows (Fig. 1):

On a support, which may for instance consist of a vertical plate 17 integral with tripod 3, I dispose a frame 18 capable of pivoting about a vertical axis, and then on said frame, I dispose a second one 19 capable of pivoting about a horizontal axis, and finally, I mount the needle holder in a slidable manner in a sleeve 20 integral with a support 21 itself fixed to frame 19. The pivoting movement of said frames are made possible through the provision either of articulations or of flexible connections, consisting for instance of flexible bands such as 22 for frame 18 and 23 for frame 19.

It then suffices to mount the three deformable boxes $11^2$, $11^3$ and $11^1$ on plate 17, frame 18 and frame 19 respectively, and to so arrange them that they act in the following manner:

The box that is carried by plate 17 acts on a lever rigidly fixed to frame 18. The box that is carried by frame 18 acts on a lever rigidly fixed to frame 19, and the box that is carried by frame 19 acts on the end of the rod of needle holder 16, said needle holder being further subjected to the action of return spring 25. Instead of having flexible tubes that are directly connected to the deformable boxes, I may interpose metallic tubes 24.

Figure 1A:
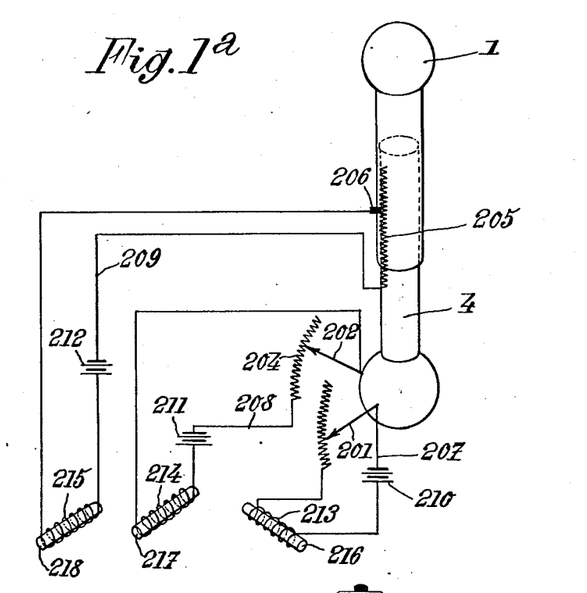
Fig. 1a is a diagrammatical perspective view of an embodiment of my invention utilizing electrical means.

In the embodiment of Fig. 1a lever 4, which slidably supports operating element 1, is connected through a universal joint to a support not shown in the figure, in the same manner as lever 4 of Fig. 1, is connected to support 2. This lever 4 carries two arms 201 and 202 at right angles to each other and the ends of which move along resistances 203 and 204 respectively, thus forming two rheostats controlled by said lever 4. Lever 4 is provided with a resistance 205 along which moves a contact 206 carried by operating organ 1, thus forming a third rheostat operated by the sliding displacements of operating member 1 with respect to lever 4. The three rheostats thus constituted are inserted in electric circuits 207, 208 and 209 respectively which comprise sources of current 210, 211 and 212 respectively. These circuits serve to energize solenoids 213, 214 and 215 respectively, adapted to control the displacements of their respective armatures 216, 217, 218 which actuate the needle in the same manner as deformable boxes $11^1$, $11^2$ and $11^3$ of the embodiment of Fig. 1. It is clear that, under these conditions, a displacement of operating organ 1 will produce a corresponding displacement of at least one of the armatures 216, 217 and 218.

Figure 5:
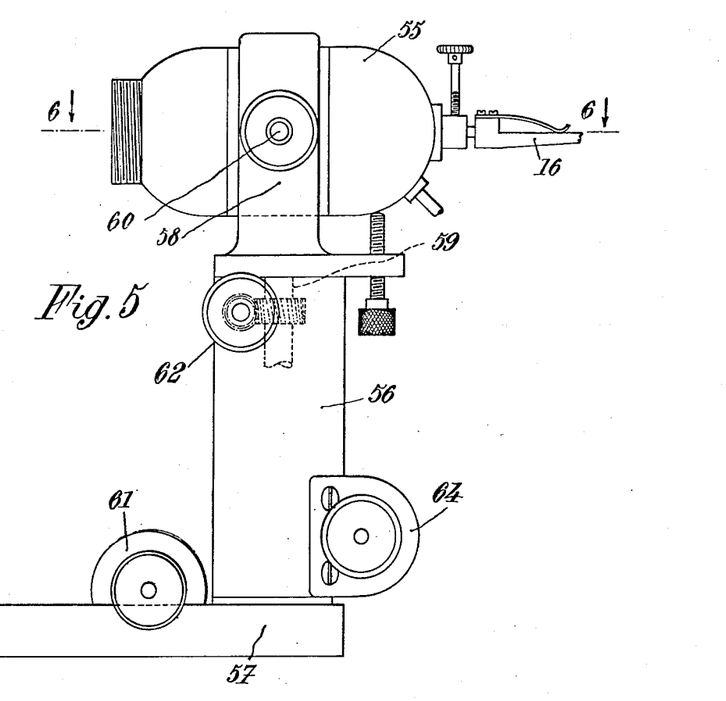
Fig. 5 is a plan view of a portion of another embodiment of the apparatus according to my invention.
Figure 6:
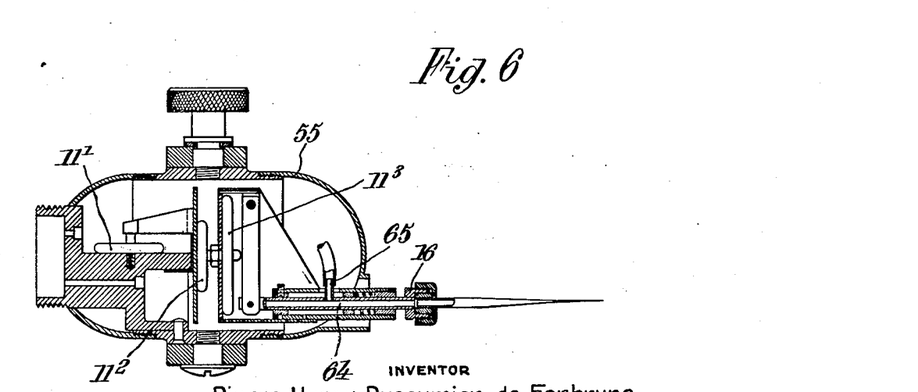
Fig. 6 is a sectional view on the line 6—6 of Fig. 5.

In Figs. 5 and 6, I have shown another embodiment of the arrangement of the deformable boxes.

All of said boxes are mounted inside a casing 55, carried by a frame provided with means for permitting said casing to be given certain displacements, preferably in all directions, so that the needle may be quickly brought into any desired position at the beginning of the operation.

Said frame will comprise for instance, on the one hand, a vertical arm 56 capable of being moved horizontally along a support 57, and on the other hand a stirrup 58 carried at the free end of said arm so as to be capable of pivoting about a vertical spindle 59, casing 55 being itself capable of pivoting inside said stirrup 58 about a spindle 60 at right angles to stirrup 58.

In order to displace elements 56, 58 and casing 55, I utilize any suitable means controlled for instance through milled wheels 61, 62, 63. Arm 56 may further be made extensible under the action of a milled nut 64.

Finally, when it is desired to fit at the end of support 16 an injection needle, said support may be provided with a conduit $64^1$ into which the liquid to be injected is introduced through a conduit 65 (Fig. 6).

Of course the correspondence between said deformable boxes and the components of the movements of the operating organ may be established in any suitable way. Preferably, I arranged the whole in such a manner that, account being taken of the inverted position of the image given by the microscope, the movement of the hand of the operator on the operating organ takes place in the same direction as the movement of the needle seen through the microscope.

These conditions are fulfilled with the arrangement of Fig. 1 in which, when lever 4 is moved towards the right, thus actuating the piston of the cylinder connected with the deformable box carried by frame 19, said box is so arranged as to push the needle towards the left. It would be found in a likewise manner, that if the lever is pushed towards the front, the needle is displaced towards the rear.

Finally, in order to protect the needle against outside vibrations, it is advantageous to make movable frames 18 and 19 of a light material.

The device that has just been described has considerable advantages over existing devices of that kind especially concerning its application to microscopy.

As a matter of fact, up to the present time, use was made of micrometric devices which were more or less rigidly connected with the microscope itself. Now, on the one hand these devices do not permit to obtain a suitable precision, and on the other hand these direct connections between the controlling screws and the needle holder, causes unconscious movements of the hand of the operator to be transmitted to the whole device, which produces secondary displacements of the needle which further diminish the precision.

On the contrary, the device according to my invention has the following advantages:

(a) It is possible to obtain displacements as small as it is desired, since the ratio of reduction between the movements of the operating organ and those of the needle can be very high, and can be varied for each enlargement owing to the provision of screws such as 13.

(b) The needle can be moved in all possible directions, and this simultaneously, which could not be obtained with existing apparatus for the same purpose.

(c) The needle is no longer sensitive to the trembling of the hand of the operator.

My invention is not limited to the use above referred to. It may for instance be applied to the writing and engraving in microscopic characters, to the retouching of coloured photographs, which consists in injecting onto the plate itself, through the microscope, pigments or coloured drops of exceedingly small dimensions, to the retouching of sound inscriptions on cinematographic films, to the controlling of condensors or other elements in order to emit radio-electric waves of different wave-lengths that are to be received by suitable receiving devices for controlling from a distance the displacements of moving bodies, to the adjustment of the air-fuel mixture in internal combustion engines, to the displacing of an object in the field of a projecting apparatus so that said object may be seen on the screen itself, etc.

According to the last mentioned application, a lecturer utilizing the projection of a cinematographic film or of other pictures might be dispensed from the necessity of moving a rod over the screen. It would suffice for him to have recourse to an apparatus according to my invention adapted to move a needle in the immediate vicinity of the film. In this case, the apparatus would need to comprise only two deformable boxes or equivalent receiving devices, the needle being adapted to move only in a given plane.

Figure 7:
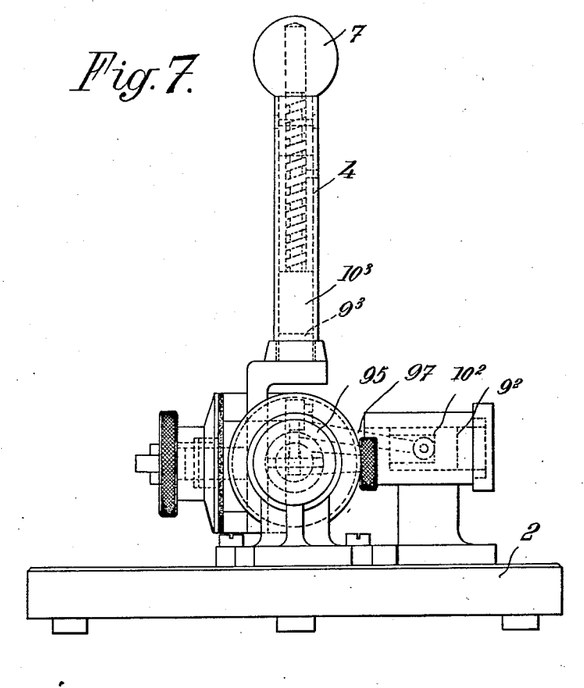
Fig. 7 is an elevational view of another embodiment of the control device according to my invention.
Figure 8:
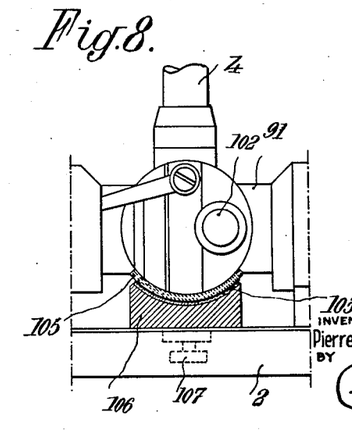
Figs. 8 and 9 are respectively a plan view and a lateral view of the device according to Fig. 7.
Figure 9:
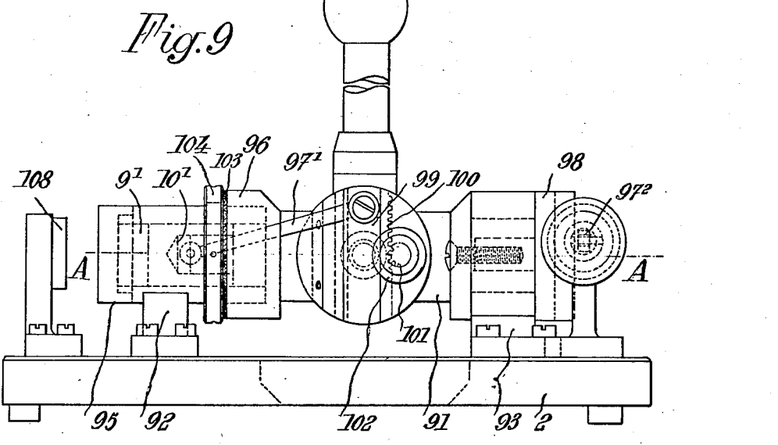

In the embodiment of Figs. 7 to 9 inclusive, the kinematic connection between operating lever 4 and pistons $10^1$ and $10^2$ is obtained through connecting rods actuated by cranks that are respectively pivoted about the axes A—A and B—B of the universal joint. The whole is so arranged that a rotation about one of said axes can operate only the corresponding piston.

To this effect, the universal joint may consist of a frame 91 journalled in at least one, or preferably two bearings 92, 93 coaxial with axis A—A. The operating lever has its lower end 94 pivotally mounted in said frame so as to rotate about an axis B—B at right angles to axis A—A, and preferably intersecting it.

One of the cylinders $9^1$ is mounted in such manner that its axis coincides with axis A—A, said cylinder being preferably provided in a piece 95 fixed to one of said bearings 92, and on which is journalled a sleeve 96 integral with pivoting frame 91. (Of course said sleeve and the wall of said cylinder might be in a single piece, the cylinder then pivoting about axis A—A instead of being stationary.)

The second cylinder $9^2$ is so mounted that its axis is located in a plane passing through axis A—A, at right angles to said axis, said cylinder being disposed for instance on the side of bearing 93 located opposite bearing 92 that carries the first cylinder.

The connecting rod $97^1$ of the piston that reciprocates in cylinder $9^1$ is pivoted to the lower part 94 of lever 4. The connecting rod $97^2$ of the piston that reciprocates in cylinder $9^2$ is pivoted to a plate 98 adapted to pivot, together with frame 91, about axis A—A, said flange being fixed for instance to the end of the spindle $98^1$ through which said frame is journalled in bearing 93. The cranks of said rods are therefore pivoted about axes B—B and A—A respectively.

It will be readily understood that owing to this arrangement, the pivoting movements of lever 4 about axis B—B are transmitted only to piston $9^1$, while the pivoting movements of lever 4 about axis A—A are transmitted only to piston $9^2$.

Preferably, I do connect the rods $97^1$ and $97^2$ not directly to parts 94 and 98 respectively, but to elements 99 that are adjustably fixed thereto so that the length of said crank arms can be adjusted. Said elements 99 consist for instance of sliding members actuated by means of a rack 100 provided in each of said members and meshing with a pinion 101 itself controlled by a milled knob 102.

It is further advantageous to provide braking means adapted to ensure a suitable stability of lever 4 in each of its positions. In the embodiment of Figs. 7 to 9, these braking means consist of linings 103 adapted to brake the two pivoting displacements of the control device about its axes A—A and B—B, said linings being advantageously subjected to an adjustable pressure through tightening organs such as 104.

Finally, the whole of the apparatus is carried by stationary frame 2 on which I can also fix a sleeve 108 to which will be fitted the flexible tubes that must connect said apparatus to the deformable boxes or membranes above referred to, said sleeve itself being connected through suitable conduits to the various cylinders.

Figure 10:
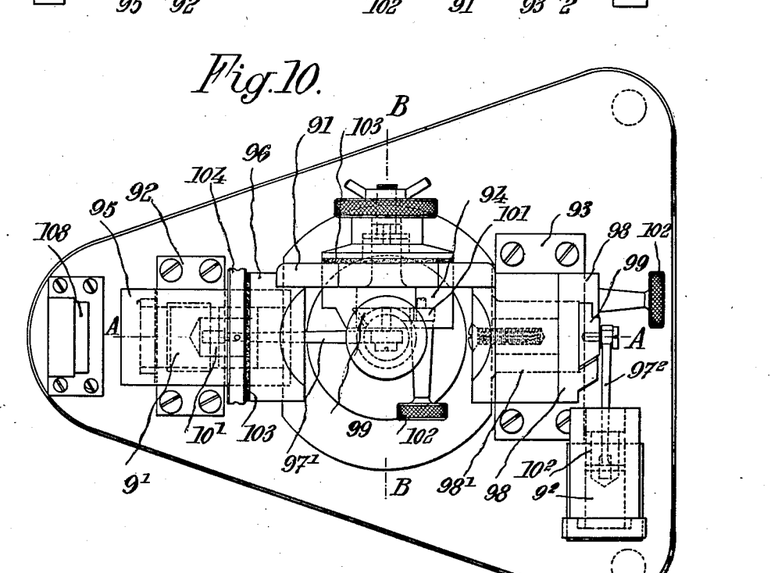
Fig. 10 is an elevational view partly in section of still another embodiment of the device according to my invention.
Figure 11:
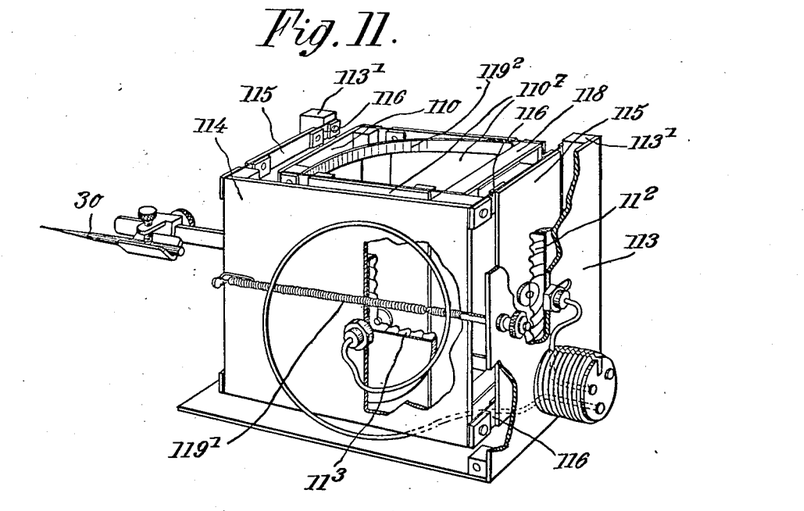
Figs. 11, 12 and 13 are different perspective views of still another embodiment of the apparatus according to my invention.

Fig. 10 is a detail view illustrating another possible arrrangement of the braking means above referred to. In this case, a spherical member 105 is rigidly fixed to the lower end 94 of lever 4, this spherical member having its center at the point of intersection of axes A—A and B—B. In this case, the lining 103 is interposed between said spherical member 105 and a stationary piece 106 of corresponding spherical shape, the position of which can be adjusted by means of organ 107.

In the embodiment shown in Figs. 11 to 14, the motion transmitting means may be of any of the types above described, that is to say pneumatic, hydraulic, hydropneumatic, or electric, but the receiving organs are so devised that no guiding devices are provided for the needle.

Furthermore, I preferably so dispose these receiving organs that, for at least some of the displacements to be imparted to the needle, the latter is given translatory displacements either along its own direction or transversally thereto, in which case the needle moves parallelly to itself.

Such an arrangement is particularly advantageous in view of the fact that, since the needle is given translatory displacements, the amplitude of the displacements of its point is independent of the length of said needle.

Let it be supposed that three deformable boxes $11^1$, $11^2$, $11^3$ are adapted to give the needle displacements in three directions of the space, that is to say displacements along its axis and displacements in two planes at right angles to each other and passing through said axis. It is advantageous that the needle should be carried by a system of three frames connected between themselves in such manner that each of them transmits to the following one only translatory displacements along one of the three above mentioned directions.

Preferably, each of these frames consists substantially of at least one parallelogram adapted to be angularly and elastically deformed, one of the sides of said parallelogram being given translatory displacements.

According to the embodiment shown in the drawings, it has been supposed that the arrangement above referred to was applied only to two of the three kinds of displacements to be imparted to the needle. In other words, the needle is maintained in the same direction only when it is actuated in the direction of its axis or transversally thereto in a plane passing through said axis, for instance, a horizontal plane (it being supposed by way of example that the needle is horizontal) while the displacements in the vertical axial plane take place by rotation about a horizontal axis. This arrangement permits to simplify the mounting of the needle, but is of course given merely by way of example.

Adverting to the drawings (Fig. 12), the support 16 of needle 30 is mounted on a plate 110 provided with an aperture $110^a$ through which said support 16 extends at right angles, the connection between support 16 and plate 110 being ensured by elastic bands 111 forming an articulation about a horizontal axis. A deformable box 11′ is caused to act on a lever 112 rigidly connected to support 16.

Figure 12:
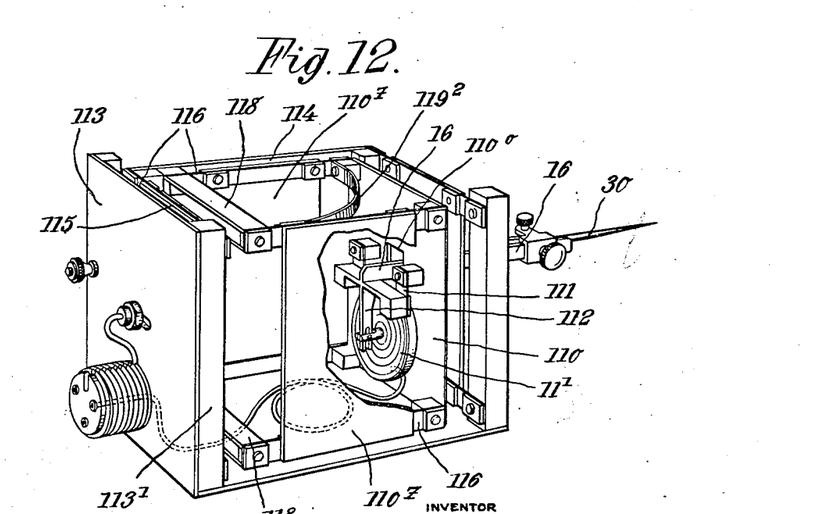
Figure 13:
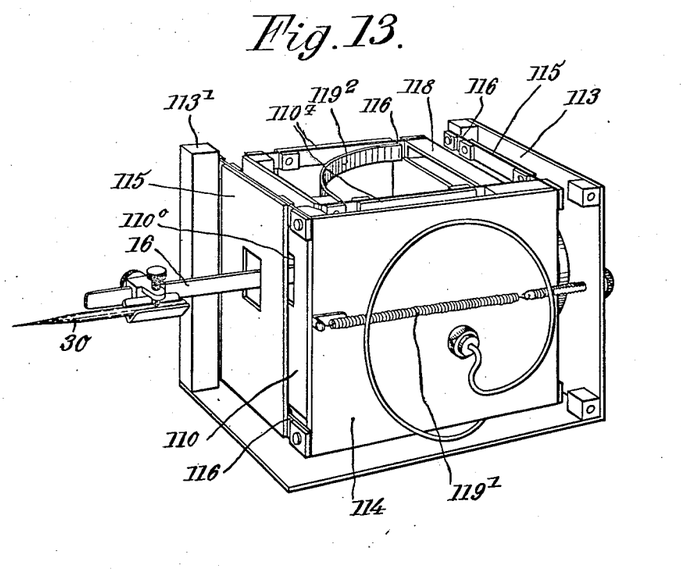

In order to be able to give plate 110 two series of displacements for which said plate moves on the one hand in its own plane in a horizontal direction (displacements of the needle in its horizontal plane) and on the other hand at right angles to its own plane (displacements of the needle in the direction of its own axis) said plate is connected to a fixed frame 113 through two deformable systems made as follows:

One of said systems consists of a central plate 114 and two lateral plates 115 connected together by elastic bands 116, said lateral plates being thus parallel and connected, also through elastic bands, to two stationary uprights $113^1$ of frame 113, the whole being thus given the shape of a deformable parallelipipedon deformable in such manner that plate 114 moves parallelly to its own plane. If the displacements are of small amplitude, it may be considered that plate 114 moves in its own plane and in a horizontal direction, and therefore, in the direction of the needle.

On said first system, I then mount a second similar system in which plate 110, which carries the support for the needle is the central plate, while the lateral plates $110^7$ are fixed to elements such as cross members 118 themselves fixed to plate 114 at right angles thereto.

Finally, I insert deformable boxes, $11^2$ and $11^3$ respectively between fixed frame 113 and one of the plates 115 on the one hand, and plate 114 and one of the lateral plates $110^7$ on the other hand.

I further provide, if necessary, return springs $119^1$, $119^2$.

Figure 14:
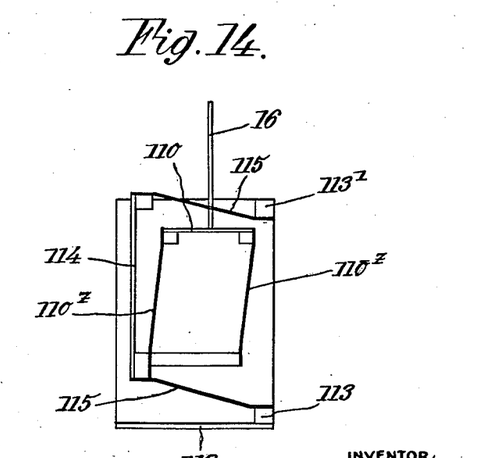
Fig. 14 is a diagrammatical plane view illustrating the operation of the apparatus shown in Figs. 11, 12 and 13.

The system above described and which is diagrammatically illustrated in Fig. 14 is such that for any deformation that is imparted thereto, plate 114 is maintained in the same direction same as cross members 117. It results therefrom that plate 110 is itself maintained always in the same direction according to the condition above stated.

Of course the needle instead of being maintained in a pivoting manner on plate 110, might be integral with one of the elements of a third parallelogram or parallelipipedon.

Besides, instead of using parallelograms, I might use deformable systems of any shape whatever, provided that the conditions above stated are maintained.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. An apparatus of the type described for controlling the displacements of an object, which comprises in combination, a holder for said object, a support for said holder, elastic means for connecting said holder to said support, at least one chamber of variable volume interposed between said holder and said support for controlling the position of said holder with respect to said support, a second support mechanically unconnected with the first mentioned support, an operating organ movable with respect to said second mentioned support, a chamber of variable volume mounted on the second mentioned support, means operatively connected with said organ for controlling the volume of the last mentioned chamber, a flexible conduit for connecting together the two chamber of variable volume, and a fluid filling said two chambers and said conduit.

2. An apparatus of the type described for controlling the displacement of an object, which comprises in combination, a holder for said object, a support for said holder, an intermediate member movably carried by said support, a deformable chamber interposed between said support and said member for controlling the position of said member with respect to said support, a second deformable chamber interposed between said member and said holder for controlling the position of said holder with respect to said member, a second support mechanically unconnected with the first mentioned support, an operating organ movable with respect to the second mentioned support, two separate chambers of variable volume mounted on said second mentioned support, positive means operatively connected with said organ for controlling the volumes of the two last mentioned chambers, flexible conduits connecting the two first mentioned chambers with the two second mentioned chambers respectively, and a fluid filling said chambers and said conduits.

3. An apparatus according to claim 2 further comprising elastic means for connecting said support with said intermediate member and elastic means for connecting said intermediate member with said holder.

4. An apparatus of the type described for controlling the displacements of an object, which comprises in combination, a support, an intermediate member movably connected with said support, a second intermediate member movably connected with said first intermediate member, a holder movably connected with said second intermediate member, whereby the elementary displacements of said two intermediate members and of said holder take place in three distinct directions not parallel to a common plane, three chambers of variable volume interposed, the first between said support and said first intermediate member, the second between said first intermediate member and said second intermediate member, and the third between said second intermediate member and said holder, for controlling the elementary displacements of said elements with respect to one another, a second support mechanically unconnected with the first mentioned support, an operating organ movable with respect to the last mentioned support, three distinct chambers of variable volume mounted on said second support, means operatively connected with said organ for controlling the volumes of the three last mentioned chambers in accordance with the displacements of said organ in three distinct elementary directions respectively, flexible conduits connecting the three first mentioned chambers with the three second mentioned chambers respectively, and a fluid filling said chambers and said conduits.

5. An apparatus of the type described for transmitting at a distance reduced displacements to an object, which comprises in combination, a stationary support, a lever universally mounted on said support, two cylinders rigidly connected to said support, two pistons fitting in a fluidtight way in said cylinders respectively, an operating organ mounted on said lever, means for transmitting the pivoting displacements of said lever about an axis to one of said pistons, means for transmitting the pivoting displacements of said lever about an axis at right angles to the first mentioned axis to a second piston, two flexible tubes filled with a fluid connected with the inside of said cylinders respectively, a second support mechanically unconnected with the first mentioned one, a holder for said object movably mounted in the last mentioned support, means operative by the fluid in one of said tubes for moving said holder with respect to said second mentioned support, and means operative by the fluid in the other tube for moving said holder with respect to the second mentioned support.

6. An apparatus of the type described for transmitting at a distance reduced displacements to an object, which comprises in combination, a stationary support, a lever universally mounted on said support, two cylinders rigidly connected to said support, a third cylinder provided in said lever three pistons fitting in a fluidtight way in said cylinders respectively, an operating organ axially movable with respect to said lever, means for transmitting the pivoting displacements of said lever about an axis to one of said pistons, means for transmitting the pivoting displacements of said lever about an axis at right angles to the first mentioned axis to a second piston, means for transmitting the axial displacements of said operating organ with respect to said lever to the third piston, three flexible tubes filled with a fluid connected with the inside of said cylinders respectively, a second stationary support, mechanically unconnected with the first mentioned one, a holder for said object movably mounted in the last mentioned support, means operative by the fluid in one of said tubes for moving said holder with respect to said second mentioned support, means operative by the fluid in another tube for moving said holder with respect to said second mentioned support, and means operative by the fluid in the third tube for moving said holder with respect to said second mentioned support.

7. An apparatus of the type described for transmitting at a distance reduced displacements to an object, which comprises in combination, a stationary support, a lever universally mounted on said support, two cylinders rigidly connected to said support, a third cylinder provided in said lever three pistons fitting in a fluidtight way in said cylinders respectively, an operating organ axially movable with respect to said lever, means for transmitting the pivoting displacements of said lever about an axis to one of said pistons, means for transmitting the pivoting displacements of said lever about an axis at right angles to the first mentioned axis to the second piston, means for transmitting the axial displacements of said operating organ with respect to said lever to the third piston, three flexible tubes filled with a fluid connected with the inside of said cylinders respectively, a stationary support, a rigid plate, elastically deformable bands between said member and said support for allowing said member to pivot about a vertical axis with respect to said support, a second rigid plate, elastically deformable bands between the two above mentioned plates for allowing them to pivot about a horizontal axis with respect to each other, a frame carried by said second plate, a holder for the object slidably mounted in said frame, a deformable box connected with the first tube, interposed between the support and the first plate, a deformable box connected to the second tube interposed between the first plate and the second plate, a deformable box connected to the third tube interposed between the second plate and said holder, and elastic means for applying said holder against said last mentioned deformable box.

8. An apparatus according to claim 6 in which the means for transmitting the pivoting displacements of the lever about one of the two axes above mentioned to the corresponding piston comprise a cam rigidly connected to said lever, and a rod rigidly connected to said piston and adapted to cooperate with said cam.

9. An apparatus according to claim 6 in which the means for transmitting the pivoting displacements of the lever about one of the two axes above mentioned to the corresponding piston, comprise a piece rigidly connected to said lever, and provided with a slot acting as a cam, a rod rigidly connected to said piston, and a pin carried by said rod and engaging in said slot.

10. An apparatus according to claim 6 in which the means for transmitting the pivoting displacements of the lever about one of the two axes above mentioned to the corresponding piston, comprise a cam pivoted on said lever, a rod rigidly connected to said piston and adapted to cooperate with said cam, and adjustable means for rigidly fixing said cam with respect to said lever.

11. An apparatus according to claim 6 in which the third cylinder is mounted in said lever and the corresponding piston is rigidly connected to said operating organ.

12. An apparatus of the type described for transmitting at a distance reduced displacements to an object, which comprises in combination, a stationary support, a frame journalled in said support about a certain axis, a lever pivoted in said frame about an axis at right angles to the first mentioned one, a cylinder mounted on said support coaxial with said frame, a piston mounted with a fluidtight fit in said cylinder, a connecting rod articulated at one end with said piston and at the other end with said lever, a second cylinder rigidly fixed to said support at right angles to the first mentioned axis, a piston with a fluidtight fit in the last mentioned cylinder, a connecting rod articulated at one end on the last mentioned piston and at the other end to a point of said frame, a third cylinder provided in said lever an operating organ axially movable with respect to said lever, a piston fitting in the last mentioned cylinder in a fluidtight manner, means for transmitting to the last mentioned piston the axial displacements of the operating organ with respect to said lever three flexible tubes filled with a fluid connected with the inside of said cylinders respectively, a second stationary support mechanically unconnected with the first mentioned one, a holder for said object movably mounted in the last mentioned support, means operative by the fluid in one of said tubes for moving said holder with respect to said support, means operative by the fluid in another tube for moving said holder with respect to said second mentioned support, and means operative by the fluid in the third tube for moving said holder with respect to the second mentioned support.

13. An apparatus of the type described for imparting reduced displacements to an object which comprises in combination, a holder for the object, a support, an intermediate member, elastically deformable means between said member and said support for allowing said member to move with respect to said support, elastically deformable means between said mechanical means and said member for allowing said mechanical means to move with respect to said member, and means operative by a fluid for moving said member with respect to said support and said holder with respect to said member.

14. An apparatus of the type described for imparting reduced displacements to an object which comprises in combination, a stationary support, an intermediate member, elastically deformable means between said member and said support for allowing said member to move with respect to said support, a second intermediate member, elastically deformable means between the two above mentioned members for allowing them to move with respect to each other, a third member, elastically deformable means between the second and the third members for allowing them to move with respect to each other, a holder for the object to be displaced carried by said third member, and means operative by a fluid for moving from a distance said first member with respect to said support, said second member with respect to said first member, and said third member with respect to said second member.

15. An apparatus of the type described for imparting reduced displacements to an object which comprises in combination, a stationary support, a rigid plate, elastically deformable bands between said plate and said support for allowing said plate to pivot about a vertical axis with respect to said support, a second rigid plate, elastically deformable bands between the two above mentioned plates for allowing them to pivot about a horizontal axis with respect to each other, a frame carried by said second plate, a holder for said object slidably mounted in said frame, a deformable box, interposed between the support and the first plate, a deformable box interposed between the first plate and the second plate, a deformable box interposed between the second plate and said holder, and elastic means for applying said holder against said last mentioned deformable box and independent means for feeding fluid at a variable pressure to these three boxes respectively.

16. An apparatus of the type described for transmitting at a distance reduced displacements to an object, which comprises in combination, a stationary support, a rigid frame carried by said support, a vertical plate, two parallel vertical plates each elastically connected at one end with said support and at the other end with a different end of said first mentioned vertical plate, a member rigidly carried by said first mentioned vertical plate, a fourth vertical plate at right angles to the first mentioned one, two parallel vertical plates each elastically connected at one end with said rigid member and at the other end with a different end of the fourth mentioned vertical plate, a holder for the object to be moved movably connected to said fourth plate, and means operative by a fluid for moving said first mentioned plate with respect to said support, said fourth mentioned plate with respect to said first mentioned plate, and said holder with respect to said fourth mentioned plate.

17. An apparatus of the type described for imparting small displacements to an object, which comprises in combination, a stationary support, an intermediate member, elastically deformable means between said member and said support for allowing said member to pivot about a vertical axis with respect to said support, a second intermediate member, elastically deformable means between the two above mentioned members for allowing them to pivot about a horizontal axis with respect to each other, a holder for said object slidably mounted with respect to said second mentioned member, three chambers of variable volume interposed, the first between said first mentioned intermediate member and said support, the second between the two intermediate members, and the third between said holder and the second intermediate member, for controlling the elementary displacements of said elements with respect to one another, a second support mechanically unconnected with the first mentioned support, an operating organ movable with respect to the last mentioned support, three distinct chambers of variable volume mounted on said second support, means operatively connected with said organ for controlling the volumes of the three last mentioned chambers in accordance with the displacements of said organ in three distinct elementary directions respectively, flexible conduits connecting the three first mentioned chambers with the three second mentioned chambers respectively, and a fluid filling said chambers and said conduits.

18. An apparatus of the type described for imparting small displacements to an object, which comprises in combination, a stationary support, an intermediate member, elastically deformable means between said member and said support for allowing said member to move with a translatory motion with respect to said support, a second intermediate member, elastically deformable means between the two above mentioned members for allowing them to move with a translatory motion with respect to each other, a holder for said object movably connected to the second mentioned member, three chambers of variable volume interposed, the first between said first mentioned intermediate member and said support, the second between said two intermediate members, and the third between the second intermediate members and said holder, for controlling the elementary displacements of said elements with respect to one another, a second support mechanically unconnected with the first mentioned support, an operating organ movable with respect to the last mentioned support, three distinct chambers of variable volume mounted on said second mentioned support, means operatively connected with said organ for controlling the volume of the three last mentioned chambers in accordance with the displacements of said organ in three distinct elementary directions respectively, flexible conduits connecting the three first mentioned chambers with the three second mentioned chambers respectively, and a fluid filling said chambers and said conduits.

19. An apparatus according to claim 12 further including means for changing the point at which said connecting rod is articulated to said lever from one side of the second mentioned axis to the other side, whereby the direction of the movement given to the first mentioned piston by a given angular displacement of said lever can be inverted.

20. An apparatus of the type described for imparting small displacements to an object, which comprises in combination, a stationary support, an intermediate member, elastically deformable means interposed between said member and said support for allowing said member to move with respect to said support, a second intermediate member, elastically deformable means, interposed between said two members, for allowing them to move with respect to each other, a holder for the object to be displaced connected to the second mentioned intermediate member, means operative from a distance through a physical agent for moving said first mentioned intermediate member with respect to said support, and means operative from a distance through a physical agent for moving the second mentioned intermediate member with respect to the first mentioned intermediate member.

21. An apparatus of the type described for imparting small displacements to an object, which comprises in combination, a stationary support, an intermediate member, elastically deformable means between said member and said support for allowing said member to move with respect to said support, a second intermediate member, elastically deformable means between said two members for allowing them to be displaced with respect to each other, a holder for the object to be displaced connected to the second mentioned intermediate member, means operative by a fluid for moving said first mentioned intermediate member with respect to said support, and means operative by a fluid for moving the second mentioned intermediate member with respect to the first mentioned intermediate member.

22. An apparatus of the type described for imparting small displacements to an object, which comprises in combination, a stationary support, an intermediate member, elastically deformable bands between said member and said support for allowing said member to pivot about a vertical axis with respect to said support, a second intermediate member, elastically deformable bands between the two above mentioned members for allowing them to pivot about a horizontal axis with respect to each other, a holder for said object slidably mounted with respect to said second mentioned member, means operative from a distance through a physical agent for moving said first mentioned intermediate member with respect to said support, means operative from a distance through a physical agent for moving said second mentioned member with respect to said first mentioned member, and means operative from a distance through a physical agent for causing said holder to slide with respect to said second mentioned member.

23. An apparatus of the type described for imparting small displacements to an object which comprises in combination, a stationary support, an intermediate member, elastically deformable bands between said member and said support for allowing said member to pivot about a vertical axis with respect to said support, a second intermediate member, elastically deformable bands between the two above mentioned members for allowing them to pivot about a horizontal axis with respect to each other, a holder for the object to be displaced, slidably mounted with respect to said second mentioned member, means operative by a fluid for moving said first mentioned member with respect to said support, means operative by a fluid for moving said second mentioned member with respect to said first mentioned member, and means operative by a fluid for causing said holder to slide with respect to said second mentioned member.

24. An apparatus of the type described for imparting small displacements to an object, which comprises in combination, a stationary support, an intermediate member, elastically deformable means between said member and said support for allowing said member to move with a translatory motion with respect to said support, a second intermediate member, elastically deformable means between the two above mentioned members for allowing them to move with a translatory motion with respect to each other, a holder for said object movably connected to the second mentioned member, means operative from a distance through a physical agent for moving said first mentioned member with respect to said support, means operative from a distance through a physical agent for moving said second mentioned member with respect to said first mentioned member, and means operative fom a distance through a physical agent for moving said holder with respect to said second mentioned member.

25. An apparatus of the type described for imparting small displacements to an object, which comprises in combination, a stationary support, an intermediate member, elastically deformable means between said member and said support for allowing said member to move with respect to said support, with a translatory motion, a second intermediate member, elastically deformable means between said two members for allowing them to move with a translatory motion with respect to each other, a holder for said object connected to the second mentioned member, means operative by a fluid for moving said first mentioned member with respect to said support, means operative by a fluid for moving said second mentioned member with respect to said first mentioned member, and means operative by a fluid for moving said holder with respect to said second mentioned member.

PIERRE HENRY DUSSUMIER de FONBRUNE.